United States Patent [19]
Ekelund

[11] Patent Number: 5,203,026
[45] Date of Patent: Apr. 13, 1993

[54] METHOD OF SELECTING THE MOST SUITABLE RECEIVER ANTENNA FROM TWO OR MORE RECEIVER ANTENNAS

[75] Inventor: Björn O. P. Ekelund, Lund, Sweden

[73] Assignee: Telefonaktiebolaget L M Ericsson, Stockholm, Sweden

[21] Appl. No.: 673,304

[22] Filed: Mar. 22, 1991

[30] Foreign Application Priority Data

Apr. 10, 1990 [SE] Sweden .................... 9001311-1

[51] Int. Cl.⁵ .................................... H04B 17/02
[52] U.S. Cl. ........................... 455/134; 455/277.1; 375/100; 370/95.1
[58] Field of Search ........... 455/134, 273, 275, 277.1; 375/40, 100; 370/95.1

[56] References Cited

U.S. PATENT DOCUMENTS

| | | |
|---|---|---|
| 3,475,688 | 10/1969 | Masonson . |
| 4,328,591 | 4/1982 | Baghdady ............... 455/303 |
| 4,513,412 | 4/1985 | Cox ......................... 455/134 |
| 4,531,235 | 7/1985 | Brusen ..................... 455/273 |
| 4,549,311 | 10/1985 | McLaughlin ............ 455/277.1 |
| 4,633,519 | 12/1986 | Gotoh et al. ............ 455/134 |
| 4,710,945 | 12/1987 | Bocci et al. ............. 375/100 |

FOREIGN PATENT DOCUMENTS 0318665 6/1989 European Pat. Off. .

Primary Examiner—Reinhard J. Eisenzopf
Assistant Examiner—Timothy H. Keough
Attorney, Agent, or Firm—Burns, Doane, Swecker & Mathis

[57] ABSTRACT

The invention relates to the selection of an antenna in a receiver of a mobile radio station which forms part of a time-multiplexed radio communication system. The signal strength of each antenna is measured in each time slot which immediately precedes the time slot intended for the station concerned, and the antenna selection is effected in dependence on the measured signal strengths. In order to eliminate the risk of unsuitable antenna selection as a result of momentary falls in signal strength, the signal strength for each antenna is measured on several occasions during the time slot in which the measurements take place. The signal-strength values for each antenna are thereafter combined linearly, so as to form a suitability measurement. The antenna having the highest suitability measurement is selected for the next arriving time slot.

2 Claims, 3 Drawing Sheets

METHOD OF SELECTING THE MOST SUITABLE RECEIVER ANTENNA FROM TWO OR MORE RECEIVER ANTENNAS

TECHNICAL FIELD

The present invention relates to a method of selecting the most suitable antenna of two or more antennas in a receiver of a mobile radio station included in a time-multiplexed radio communication system for each time slot intended for the station concerned, wherein the received signal strength for each antenna is measured during a time slot which immediately precedes the time slot intended for the station concerned, and wherein the selection of the antenna is effected in dependence on these signal strengths.

BACKGROUND ART

In a radio communication system in which at least one party of an established telephone connection is mobile, the transmitted radio signals are subjected to so-called Rayleigh fading. This means that the radio wave transmitted directly from a transmitter to a receiver will interfere with a large number of reflected waves, for instance waves that have been reflected by buildings, hills and vehicles, for instance. One characteristic feature of such fading is that the strength of the signal received can be very low over short periods of time, although still have a high mean value. Similarly, the strength of the signals received may be very low when communicating between two stationary stations. Consequently, a connection may be interrupted or broken when a mobile station, for instance a vehicular mobile telephone stops at a location in which the received signal strength is low.

When the wavelength is short, for instance at the frequency of 900 MHz, two antennas located only a short distance from one another may exhibit totally different fading patterns. For instance, the received signal strength in the one antenna may be high while, at the same time, the signal strength in the other antenna is low, whereas the conditions may be the reverse only a short time thereafter. In so-called diversity reception, there is used at least two receiver antennas and the signals from these antennas are added in some suitable manner, or alternatively only the strongest signal at that moment in time is chosen. The procedure of adding several signals in a manner such that the signals will coact mutually and not extinguish one another is complicated, however.

EP, A2, 0 318 665 teaches two methods of selecting one of two receiver antennas continuously. According to one method, the strength of the signal received on the antenna used during a time slot in which transmission is effected to the receiver concerned is measured and stored. During a following time slot, when transmission is effected to another receiver, the strength of the signal for the other antenna is measured, and the measured value is then compared with the stored value of the antenna previously used. The antenna to be used during the next time slot, where transmission is to be effected to the receiver concerned, is then chosen on the basis of the highest value obtained.

According to another method, the signal strengths of both antennas are measured during a time slot in which transmission is effected to another receiver, whereafter the antenna having the highest signal strength is used during the time slot in which transmission shall be effected to the receiver concerned.

When antenna selection is effected with the aid of known methods, there is a danger that the signal strength of one antenna will be measured at precisely that moment when signal strength is very low. There is therefore a risk that a less suitable antenna will be selected, i.e. the antenna selected will not be the antenna which would provide the highest signal strength during the time slot in which transmission shall take place to the receiver concerned.

DISCLOSURE OF THE INVENTION

The object of the present invention is to provide a method of the kind defined in the introduction which will reduce the risk of selecting a less suitable antenna manifest with known methods. This is achieved by measuring the signal strengths of each respective antenna at different moments during the time slot which immediately precedes the time slot intended for the station concerned, and by combining the values of the measured signal strengths linearly in an appropriate manner. In this way, there is formed for each antenna a suitability measurement which, for instance, is proportional to the mean value of the signal strength or which is more dependent on the signal strength values at the end of a measuring period than at the beginning of a measuring period during which the signal strength is measured several times, or which is dependent on both the magnitude of the signal strength and its time derivation.

The characteristic features of the invention are set forth in the following claims.

BRIEF DESCRIPTION OF THE DRAWINGS

The invention will now be described in more detail with reference to the accompanying drawings, in which.

BEST MODES OF CARRYING OUT THE INVENTION

Figure 1A:
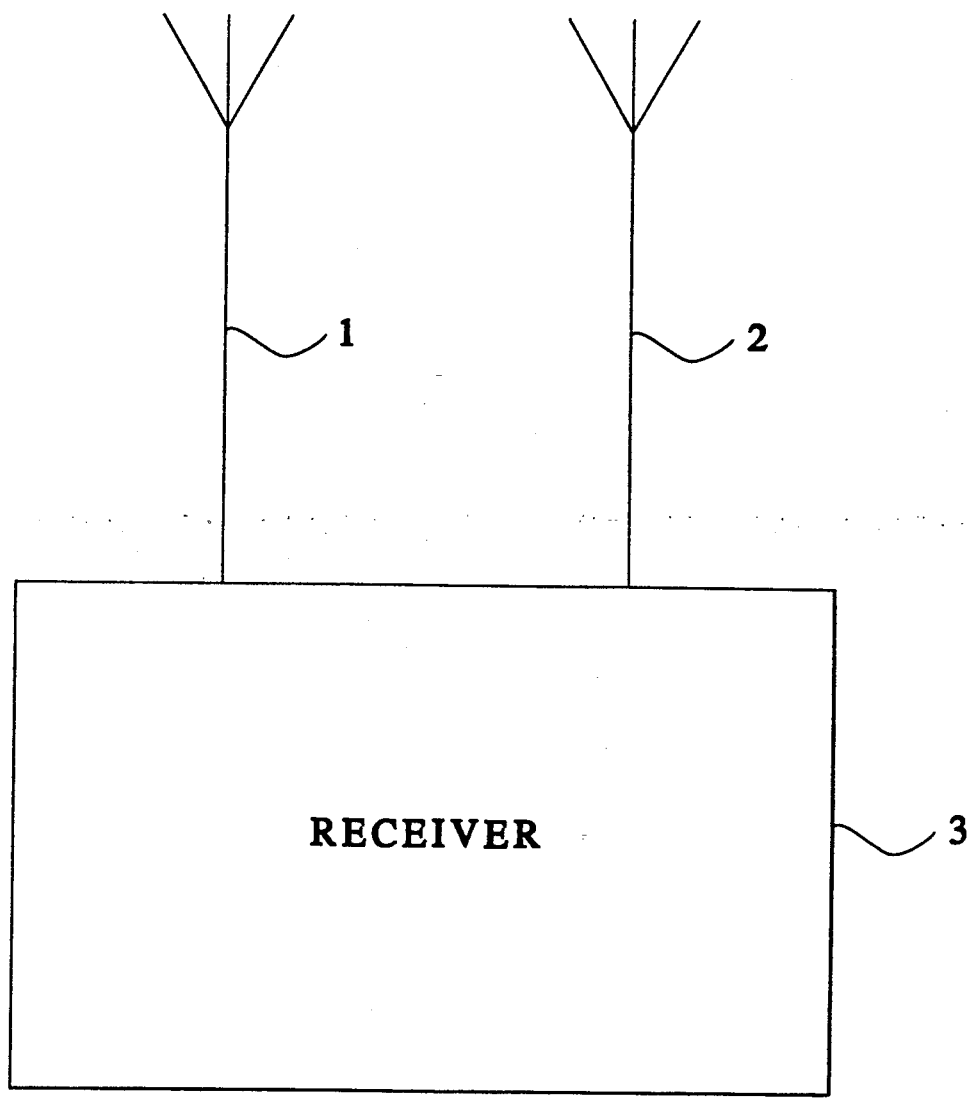
FIGS. 1a and 1b show, respectively, a receiver connected to two antennas located at a relatively short distance apart, and a diagram illustrating an example of variations in time of the strengths of signals received by the two separate antennas.
Figure 1B:
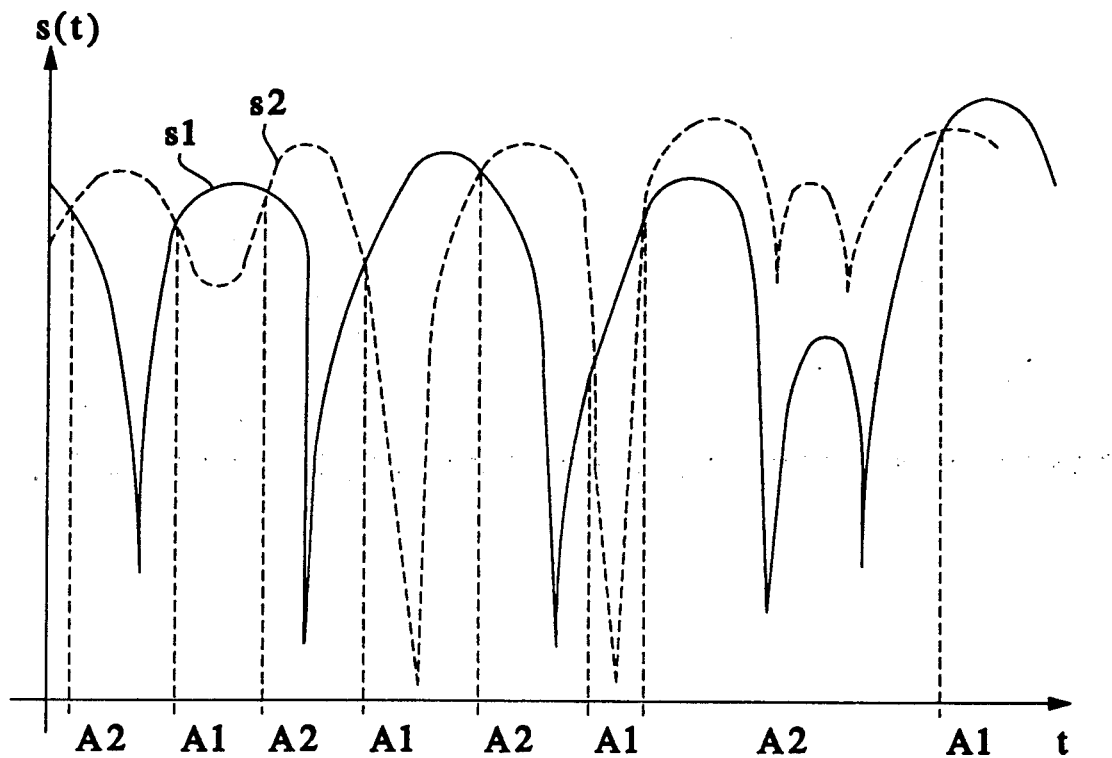

FIGS. 1a and 1b are diagrams that exemplify how the strengths of the signals received by a receiver 3 from two separate antennas can vary with time. The antennas are located at a relatively short distance apart and may, for instance, be mounted on a moving vehicle. The signal strength is designated s(t) in the diagram shown in FIG. 1b. The full line curve, s1, illustrates the signal strength on, one of the antennas, in this instance the antenna 1 shown in FIG. 1a, and the broken-line curve s2, illustrates the signal strength on the other of said antennas, in this case the antenna 2, shown in FIG. 1a. The reference signs A1 and A2 on the time axis indicate which of the antennas 1 and 2 has the highest received signal strength at that moment in time. As is evident from the curves, the received signal strength can be relatively low over short time periods. Although not shown in FIG. 1b, in the case of a time multiplex mobile telephony system the time distance between such pronounced decreases in signal strength are of the same order as the duration of a time slot.

As before mentioned, there is a danger that the wrong antenna will be selected because the strength of the signal received by the other antenna was perhaps measured during a brief fall in signal strength. It is assumed here that the signal strengths in the two antennas are measured in a time slot in which there are received signals intended for another station, and that this time slot immediately precedes a time slot in which information is transmitted to the receiver concerned.

According to the present invention, the risk of the wrong antenna being selected is reduced by measuring the signal strength of each of the two antennas on several occasions during a measuring period which falls in the time slot in which the measurements are taken. For instance, a suitability measurement in the form of a mean value of the signal strength of each antenna can thereafter be calculated and these mean values compared with one another. The antenna chosen is the antenna which has the largest calculated mean value. When forming mean values, the measuring period during which several measurements of the various signal strengths are taken should not be appreciably shorter than the duration of a time slot, otherwise it would be possible to measure all of the signal strength values of one of said antennas during one of the brief periods in which signal strength is pronouncedly decreased, therewith giving a very low and misleading mean value of the signal strength for this antenna.

In order to prevent antenna selection being unduly influenced by noise, at least ten signal strength measurements should be made with each antenna. A suitable value of the duration of a measuring period is about 30% of the duration of a time slot.

Figure 2:
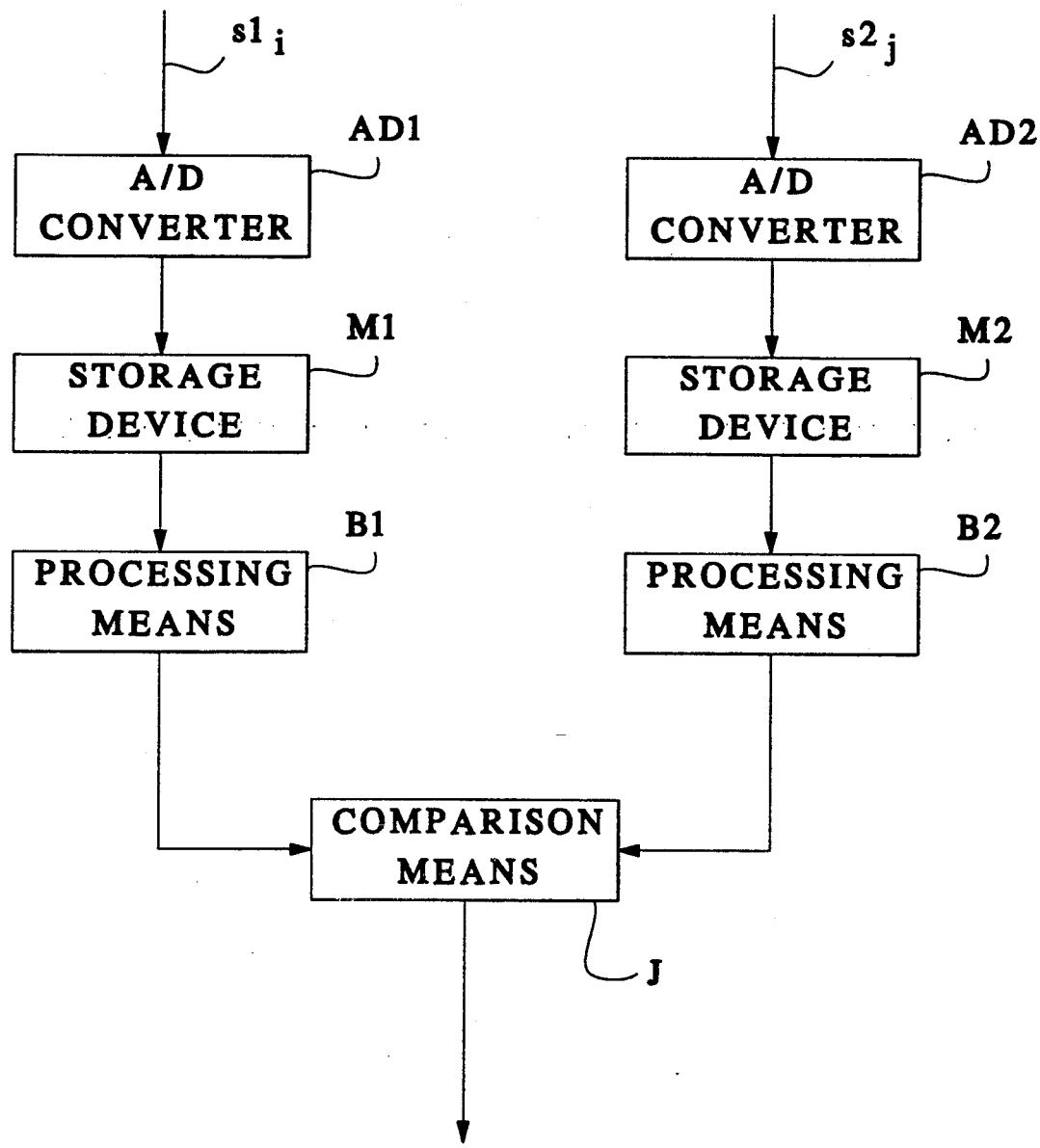
FIG. 2 illustrates an example of an arrangement for carrying out the method according to the invention.

FIG. 2 is a block schematic which illustrates an example of an arrangement for carrying out the inventive method. The measured values of the signal strengths from two receiver antennas, antenna 1 and antenna 2, are referenced $s1_i$ and $s2_j$ respectively. The values are delivered to two analog-digital converters AD1, AD2 and are then transmitted, in digital form, to two storage devices M1, M2. The signal-strength values are transmitted from the storage devices M1, M2 to two processing means B1, B2, in which a suitability measurement for each antenna is calculated, by processing these values in a predetermined manner. As before mentioned, the mean value of the signal-strength values can be calculated, for instance. Naturally, the measurement values may alternatively be simply summated for each antenna per se, thereby obtaining for each antenna a suitability measurement which is proportional to the mean value of the signal-strength values, without disclosing the actual mean value itself. The two quality measurements are finally compared in a comparison means J, wherewith an antenna is selected o the basis of the highest suitability measurement.

It is also conceivable to weight the measurement values in a suitable manner, i.e. by multiplying each of said values with a respective coefficient prior, to adding said values together. For instance, those measurement values taken at later times can be multiplied with higher multipliers than the multipliers used to multiply earlier measurement values.

It can be mentioned that the signal strength of the antenna 1 is preferably measured at slightly different time points in relation to the signal strength of the antenna 2, therewith reducing the need of receiver devices.

Figure 3:
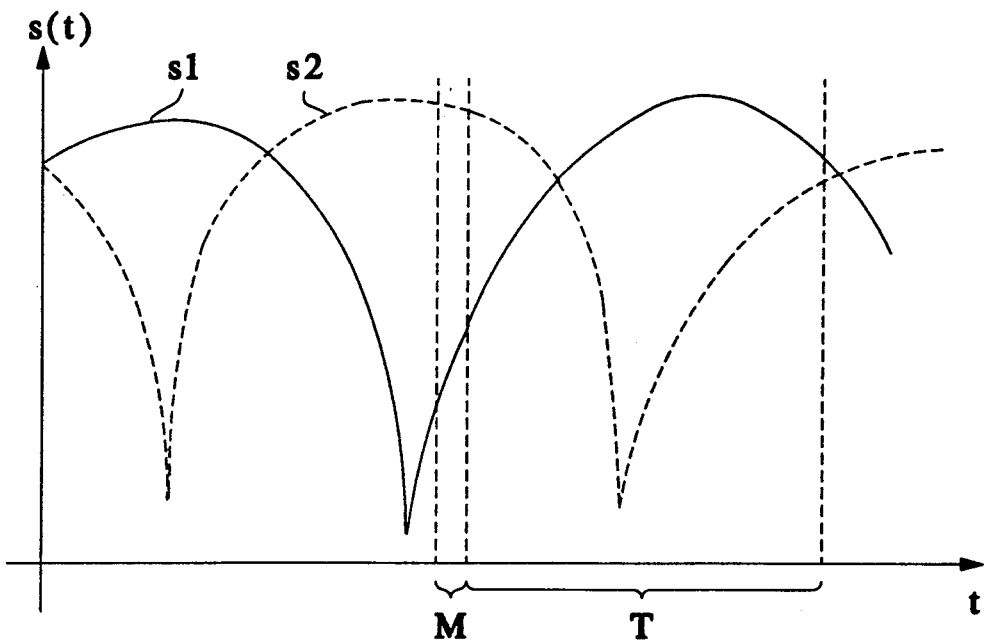
FIG. 3 is a diagram which illustrates another example of the time variations of two received signal strengths.

FIG. 3 is a second diagram showing examples of the strengths of signals received by two separate antennas. Similar to the FIG. 1 illustration, the signal strengths are referenced s1 and s2. The reference sign T signifies a time slot during which information shall be transmitted to a station for which one of two receiver antennas shall be selected. The decision as to which of the antenna shall be selected is made at the end of a measuring period M which lies at the end of a time slot which immediately precedes the time slot T and during which information is transmitted to another station. The signal strengths s1 and s2 are each measured an appropriate number of times during the measuring period M. As evident from the FIG., the signal strength s2 has a higher mean value than the signal strength s1 during the measuring period M. However, it is more suitable to select the antenna 1 having the signal strength s1 than the antenna 2, since the signal strength s1 is higher than the signal strength s2 over the major part of the time slot T. In this case, the measuring period M is short in relation to the duration of a time slot. A suitable value is about 5% of the duration of a time slot. It is therefore appropriate that the suitability measurements calculated in the processing means B1, B2 in FIG. 2 are, in this case, dependent on both signal strength and its time derivation.

A simple example of how a suitability measurement can be calculated in dependence on signal strength and time derivation can be described in the following way. Assume that only three signal-strength samples are taken for each antenna and that these samples are referenced x, y and z. A suitability measurement L can then be calculated in accordance with the formula $L=x+y+z+a(z-y)+b(y-x)$, where a and b are appropriately selected constants. This expression can be simplified to $(1-b)x+(1-a+b)y+(1+a)z$, which is a linear combination of x, y and z. The three terms x, y and z at the beginning of the formula may, of course, each be multiplied by a constant which is analogous with what was mentioned earlier. This will only change the coefficients in the linear combination to be carried out in each of the processing means B1, B2. In practice, the signal strength should also be measured at least about ten times with each antenna, in order to prevent the choice of antenna being influenced unduly by noise. A more realistic example of how a suitability measurement which is dependent on signal strength and the derivative can be calculated is described in the following way. When considering a plurality of signal-strength samples $R_i=R_1\ R_2\ R_3\ ...\ R_N$ taken at time points $t_i=t_1\ t_2\ t_3\ ...\ t_N$, the samples can be imagined as being distributed along an imaginary straight line. The purpose of the line is to form an approximation of signal strength as a function of time if the signal strength had not been influenced by noise. The equation of the line is designated $R=A+B \cdot t$, where A and B are constants. These can be evaluated by means of the least square method in the following way:

$$B = \frac{\Sigma(t_i - <t>) \times (R_i - <R>)}{\Sigma(t_i - <t>)^2}$$

$$A = <R> - B \cdot <t>, \text{ where}$$

-continued $$<t> = \frac{1}{N} \Sigma t_i,$$

$$<R> = \frac{1}{N} \Sigma R_i,$$

and where all summations proceed from i=1 to i=N.

It can be found that when a suitability measurement L is calculated as $L=A+K\cdot B$, where K is a constant, this suitability measurement will constitute a linear combination of the signalstrength samples $R_i$. This is shown below in the particular case when N=4, i.e. with only four signal-strength samples, and $t_1=0$, $t_2=T$, $t_3=2T$, $t_4=3T$. This gives the following values:

$$<t> \frac{1}{4}(0 + T + 2T + 3T) = \frac{6T}{4} = \frac{3T}{2}$$

$$<R> = \frac{1}{4}(R_1 + R_2 + R_3 + R_4)$$

The numerator in the expression for B becomes:

$$\left(0 - \frac{3T}{2}\right) \times (R_1 - <R>) + \left(T - \frac{3T}{2}\right) \times$$

$$(R_2 - <R>) + \left(2T - \frac{3T}{2}\right) \times (R_3 - <R>) +$$

$$\left(3T - 3\frac{T}{2} \times (R_4 - <R>) = \ldots = \right.$$

$$\frac{T}{2}(-3R_1 - R_2 + R_3 + 3R_4)$$

The denominator in the expression for B becomes:

$$\left(0 - \frac{3T}{2}\right)^2 + \left(T - \frac{3T}{2}\right)^2 + \left(2T - \frac{3T}{2}\right)^2 +$$

$$\left(3T - \frac{3T}{2}\right)^2 = 5T^2$$

Therefore, when the numerator is divided by the denominator, there is obtained:

$$B = \frac{-3R_1 - R_2 + R_3 + 3R_4}{10T}$$

When the value for B is inserted in the expression for A, there is obtained:

$$A = \frac{1}{4}(R_1 + R_2 + R_3 + R_4) - \frac{-3R_1 - R_2 + R_3 + 3R_4}{10T} \times$$

$$\frac{3T}{2} = \ldots = \frac{14R_1 + 8R_2 + 2R_3 - 4R_4}{20}$$

The suitability measurement $L=A+K\cdot B$ then becomes:

$$\frac{14R_1 + 8R_2 + 2R_3 - 4R_4}{20} + K \times$$

$$\frac{-3R_1 - R_2 + R_3 + 3R_4}{10T} = \left(\frac{7}{10} - \frac{3K}{10T}\right)R_1 +$$

$$\left(\frac{4}{10} - \frac{K}{10T}\right)R_2 + \left(\frac{1}{10} + \frac{K}{10T}\right)R_3 +$$

$$\left(\frac{-2}{10} + \frac{3K}{10T}\right)R$$

This expression is a linear combination of the signal-strength samples $R_1$–$R_4$. The illustrated example can be generalized for any selected number of signal-strength samples.

In the equation for the imaginary straight line $R=A+Bxt$, A represents the initial value of the line which, when the line is short, corresponds approximately to the level of the signal strength, whereas B represents the slope of the line. The constant K in the suitability measurement $L=A+K\cdot B$ may suitably have the value of about 5–10, which implies that the significance of the slope of the line is considered to be 5 to 10 times greater than the significance of the signal-strength level. This should be appropriate when the measuring period M is considerably shorter than a time slot.

As will be understood, the aforedescribed inventive method can also be applied in stations which include more than two antennas, wherein a suitability measurement is calculated for each antenna, as in the case with solely two antennas.

What is claimed is:

1. In a time-multiplexed radio communication system having a mobile radio station receiver, the system including an allocated time slot during which the receiver is intended to communicate, a method of selecting, from two or more antennas in the receiver, a most suitable antenna for communication during the allocated time slot, comprising the steps of:

for each of the antennas, making a plurality of signal strength measurements during a time interval in a time slot which precedes the allocated time slot, wherein the duration of the time interval is short in relation to the duration of the time slot;

for each of the antennas, linearly combining the plurality of signal strength measurement values to form a suitability measurement that is indicative of the antenna's suitability for use in the receiver during communication in the allocated time slot, wherein the step of linearly combining includes the step of multiplying each of the plurality of signal strength measurement values by a coefficient that is a function of a time derivative of the signal strength measurement values; and selecting an antenna for use in the receiver during communication in the allocated time slot by choosing an antenna having a highest suitability measurement.

2. In a time-multiplexed radio communication system having a mobile radio station receiver, the system including an allocated time slot during which the receiver is intended to communicate, an apparatus for selecting, from two or more antennas in the receiver, a most suitable antenna for communication during the allocated time slot, comprising:

a plurality of generating means for generating a suitability measurement of an antenna, the suitability measurement being indicative of the antenna's suitability for use in the receiver during communication in the allocated time slot, each generating means coupled to receive a plurality of signal strength measurement values made from an antenna signal during a time interval in a time slot which precedes the allocated time slot, wherein the duration of the time interval is short in relation to the duration of the time slot, and wherein the generating means linearly combines the plurality of signal strength measurement values to form the suitability measurement, and wherein further the generating means multiplies each of the pluraliity of signal strength measurement values by a coefficient that is a function of a time derivative of the signal strength measurement values in order to produce the suitability measurement; and comparison means for generating an antenna selection signal which is indicative of an antenna that should be used in the receiver during communication in the allocated time slot, the comparison means being coupled to receive the suitability measurements from the plurality of generating means, and wherein the comparison means generates the antenna selection signal by determining which antenna corresponds to a highest suitability measurement.

* * * * *